(12) United States Patent
Li

(10) Patent No.: US 10,901,259 B2
(45) Date of Patent: Jan. 26, 2021

(54) SHADING TAPE, BACKLIGHT UNIT AND DISPLAY DEVICE

(71) Applicants: BOE Technology Group Co., Ltd., Beijing (CN); BOE Optical Science and Technology Co., Ltd., Jiangsu (CN)

(72) Inventor: Wenjun Li, Beijing (CN)

( * ) Notice: Subject to any disclaimer, the term of this patent is extended or adjusted under 35 U.S.C. 154(b) by 267 days.

(21) Appl. No.: 16/038,811

(22) Filed: Jul. 18, 2018

(65) Prior Publication Data

US 2019/0204680 A1 Jul. 4, 2019

(30) Foreign Application Priority Data

Jan. 2, 2018 (CN) .................... 2018 2 0006196 U

(51) Int. Cl.
*G02F 1/1335* (2006.01)
*G02F 1/13357* (2006.01)
*G02F 1/1333* (2006.01)
*F21V 8/00* (2006.01)

(52) U.S. Cl.
CPC ..... *G02F 1/133602* (2013.01); *G02B 6/0031* (2013.01); *G02F 1/133385* (2013.01); *G02F 1/133615* (2013.01); *G02F 2001/133628* (2013.01)

(58) Field of Classification Search
None
See application file for complete search history.

(56) References Cited

U.S. PATENT DOCUMENTS

2017/0118865 A1* 4/2017 Chang ............... F28F 21/04
2020/0084875 A1* 3/2020 Umeda ............... H01L 23/12

FOREIGN PATENT DOCUMENTS

CN 203718516 U 7/2014
CN 204168701 U 2/2015

* cited by examiner

*Primary Examiner* — Richard H Kim
(74) *Attorney, Agent, or Firm* — Arent Fox LLP; Michael Fainberg

(57) ABSTRACT

The disclosure relates to a shading tape, a backlight unit and a display device. The shading tape includes: a tape body; a buffer layer located at a side of the tape body and provided with a through groove running through the buffer layer in a direction perpendicular to the tape body; a heat dissipating component located in the through groove; and a sealing layer located at a side of the buffer layer far away from the tape body and configured to close an opening of the through groove at the side of the buffer layer far away from the tape body.

19 Claims, 3 Drawing Sheets

SHADING TAPE, BACKLIGHT UNIT AND DISPLAY DEVICE

CROSS-REFERENCES TO RELATED APPLICATIONS

This application claims priority to Chinese patent application No. 201820006196.9 filed on Jan. 2, 2018, which is incorporated herein by reference in its entirety.

TECHNICAL FIELD

The disclosure relates to the field of display technologies, and particularly to a shading tape, a backlight unit and a display device.

BACKGROUND

With the rapid development of the smart phones, the performance requirements of the backlight module are also higher and higher on the market, and the backlight module generally requires narrow border, high brightness, higher reliability and others. The higher the brightness of the backlight module is, the more the local heat accumulated in front of the light emitting surface of the LED is. When the operation time is longer, the local temperature of some backlight modules may be up to 55 degrees or above. The temperature above 55 degrees severely affects the performance of the light guide plate and the performance of the membrane materials. For example, the temperature above 55 degrees may cause the bending and yellowing of the light guide plate and also the bending phenomenon of the membrane materials, which causes the yellowing and wrinkling of the pictures in terms of the modules, affects the user experience and also shortens the service life of the smart phone.

SUMMARY

In one aspect, the disclosure provides a shading tape. The shading tape includes: a tape body; a buffer layer located at a side of the tape body and provided with a through groove running through the buffer layer in a direction perpendicular to the tape body; a heat dissipating component located in the through groove; and a sealing layer located at a side of the buffer layer far away from the tape body and configured to close an opening of the through groove at the side of the buffer layer far away from the tape body.

In some embodiments, the buffer layer is a foam layer.

In some embodiments, the buffer layer is a strip-shaped foam, the through groove is a strip-shaped through groove, and the strip-shaped foam includes a first side wall, a second side wall, a third side wall and a fourth side wall perpendicular to the tape body, the first side wall is opposite to the third side wall, and the second side wall is opposite to the fourth side wall.

In some embodiments, a size of the strip-shaped foam in a direction perpendicular to the tape body is greater than or equal to 0.06 mm and less than or equal to 0.2 mm; a size of the heat dissipating component in the direction perpendicular to the tape body is less than or equal to the size of the strip-shaped foam in the direction perpendicular to the tape body.

In some embodiments, a size of the sealing layer in a direction perpendicular to the tape body is less than or equal to 0.05 mm.

In some embodiments, sizes of the first and third side walls in the arranging direction of the first and third side walls are both greater than or equal to 0.3 mm; and/or sizes of the second and fourth side walls in the arranging direction of the second and fourth side walls are both greater than or equal to 0.3 mm.

In some embodiments, sizes of the first and third side walls in the arranging direction of the first and third side walls are same; and/or sizes of the second and fourth side walls in the arranging direction of the second and fourth side walls are same.

In some embodiments, the sealing layer is a single-sided tape.

In some embodiments, the tape body is a double-sided tape.

In some embodiments, the heat dissipating component is a graphite flake.

In another aspect, the disclosure further provides a backlight unit. The backlight unit includes: a light guide plate; a light source arranged at a light incidence side of the light guide plate; and optical film materials arranged at a light emergence side of the light guide plate, and a shading tape, which includes: a tape body; a buffer layer located at a side of the tape body and provided with a through groove running through the buffer layer in a direction perpendicular to the tape body; a heat dissipating component located in the through groove; and a sealing layer located at a side of the buffer layer far away from the tape body and configured to close an opening of the through groove at the side of the buffer layer far away from the tape body; wherein the shading tape is located at a side of the optical film materials far away from the light guide plate, and the buffer layer of the shading tape is located at a side of the tape body far away from the optical film materials.

In some embodiments, the backlight unit further includes: a reflective sheet arranged at a side of the light guide plate far away from its light emergence surface, wherein a portion of the reflective sheet corresponding to the light source is provided with a via hole.

In some embodiments, a diameter size of the via hole is less than or equal to 0.5 mm.

In some embodiments, the buffer layer is a foam layer.

In some embodiments, the buffer layer is strip-shaped foam, the through groove is a strip-shaped through groove, and the strip-shaped foam includes a first side wall, a second side wall, a third side wall and a fourth side wall perpendicular to the tape body, the first side wall is opposite to the third side wall, and the second side wall is opposite to the fourth side wall.

In some embodiments, a size of the strip-shaped foam in a direction perpendicular to the tape body is greater than or equal to 0.06 mm and less than or equal to 0.2 mm; a size of the heat dissipating component in the direction perpendicular to the tape body is less than or equal to the size of the strip-shaped foam in the direction perpendicular to the tape body.

In some embodiments, a size of the sealing layer in a direction perpendicular to the tape body is less than or equal to 0.05 mm.

In some embodiments, sizes of the first and third side walls in an arranging direction of the first and third side walls are both greater than or equal to 0.3 mm; and/or sizes of the second and fourth side walls in an arranging direction of the second and fourth side walls are both greater than or equal to 0.3 mm.

In some embodiments, sizes of the first and third side walls in an arranging direction of the first and third side walls are same; and/or sizes of the second and fourth side walls in an arranging direction of the second and fourth side walls are same.

In another aspect, the disclosure further provides a display device, including a backlight unit. The backlight unit includes: a light guide plate; a light source arranged at a light incidence side of the light guide plate; optical film materials arranged at a light emergence side of the light guide plate; and a shading tape. The shading tape includes: a tape body; a buffer layer located at a side of the tape body and provided with a through groove running through the buffer layer in a direction perpendicular to the tape body; a heat dissipating component located in the through groove; and a sealing layer located at a side of the buffer layer far away from the tape body and configured to close an opening of the through groove at the side of the buffer layer far away from the tape body. The shading tape is located at a side of the optical film materials far away from the light guide plate, and the buffer layer of the shading tape is located at a side of the tape body far away from the optical film materials.

BRIEF DESCRIPTION OF THE DRAWINGS

In order to make the technical solutions in the embodiments of the disclosure more apparent, the drawings to be used in a description of the embodiments will be briefly introduced below, and apparently the drawings to be described below are merely illustrative of some embodiments of the disclosure, and those ordinarily skilled in the art can derive from these drawings other drawings without any inventive effort.

DETAILED DESCRIPTION

Figure 1:
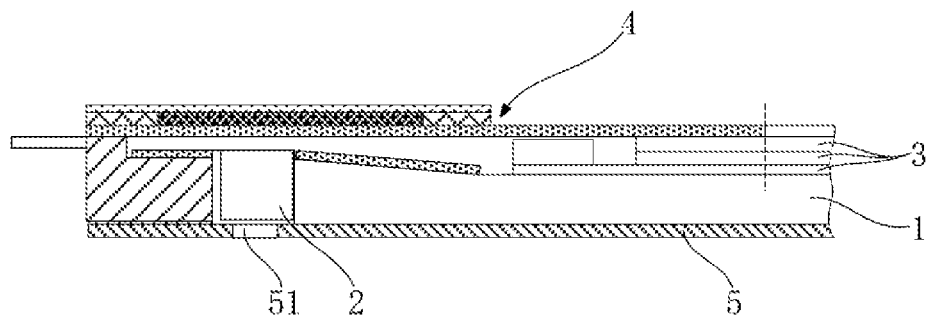
FIG. 1 is a schematic local structural diagram of a backlight unit in accordance with an embodiment of the disclosure.

The technical solutions of the embodiments of the disclosure will be described clearly and completely below in combination with the accompanying drawings of the embodiments of the disclosure. Obviously the described embodiments are only a part of the embodiments of the disclosure but not all the embodiments. Based upon the embodiments of the disclosure, all of other embodiments which can occur to those ordinary skilled in the art without any inventive effort shall fall into the protection scope of the disclosure.

In the related art, in order to solve the heat dissipation problem, the back plate structure may added in the backlight module to enhance the heat dissipation, but the whole thickness of the backlight unit is also be increased with the adding of the back plate structure.

Referring to FIGS. 1 to 5, a shading tape 4 according to the embodiments of the disclosure includes: a tape body 41, a buffer layer 42 located at a side of the tape body 41 and provided with a through groove 425 running through the buffer layer 42 in the direction perpendicular to the tape body 41, a heat dissipating component 43 located in the through groove 425, and a sealing layer 44 located at a side of the buffer layer 42 far away from the tape body 41 and configured to close an opening of the through groove 425 at the side of the buffer layer 42 far away from the tape body 41.

In the shading tape 4, the shading tape 4 is configured with the buffer layer 42 at one side of the tape body 41. Optionally one side of the buffer layer 42 is glued to one side of the tape body 41, the orthographic projection of the buffer layer 42 on the tape body 41 falls within the tape body 41, and the buffer layer 42 is configured with the through groove 425 running through the buffer layer 42 in the direction perpendicular to the tape body 41. Since the surface of the buffer layer 42 facing to the tape body 41 is glued to the tape body 41, the first opening of the through groove 425 of the buffer layer 42 facing to the tape body 41 is closed by the tape body 41. The second opening is formed at the surface of the buffer layer 42 far away from the tape body 41, that is, the second opening is the opening of the through groove 425 formed at the surface of the buffer layer 42 far away from the tape body 41. The heat dissipating component 43 is arranged in the through groove 425, the sealing layer 44 is arranged at the side of the buffer layer 42 far away from the tape body 41, and the sealing layer 44 covers the surface of the buffer layer 42 far away from the tape body 41 to close the second opening. The heat dissipating component 43 has the heat dissipation function. The shading tape 4 is configured in the backlight unit, the heat dissipating component 43 is arranged in the through groove 425, and the side of the heat dissipating component 43 facing to the tape body 41 contacts the tape body 41 directly, which is more beneficial to the heat conduction and heat dissipation of the heat dissipating component 43, and can enhance the heat dissipation, help to lower the internal temperature of the backlight unit during operation, effectively relieve the performance damage of the light guide plate 1 and other optical film materials 3 of the backlight unit due to the excessively high temperature and help to extend the service life of the backlight unit. Furthermore, the tape body 41, the buffer layer 42 and the sealing layer 44 form a structure surrounding the outside of the heat dissipating component 43, that is, the heat dissipating component 43 is located in the enclosure space formed by the tape body 41, the buffer layer 42 and the sealing layer 44, which is stable and reliable, protects the heat dissipating component 43 and prevents the heat dissipating component 43 from the break or damage, thus avoiding the effect on the display effect and other properties of the display device due to the damage of the heat dissipating component 43.

Therefore the heat dissipating component 43 is arranged in the buffer layer 42 of the shading tape 4. The shading tape 4, when applied to the backlight unit, can enhance the heat dissipation and help to lower the internal temperature of the backlight unit, which can effectively relieve the performance damage of the light guide plate 1 and other optical film materials 3 of the backlight unit due to the excessively high temperature and help to extend the service life of the backlight unit. Also the configuration structure of the heat dissipating component 43 is simple and easy to fabricate, which facilitates the thinning tendency of the backlight unit, and it is stable and reliable and has the lower cost.

In some embodiments, in the shading tape 4, the sealing layer 44 covers the whole surface of the buffer layer 42 far away from the tape body 41, to make the second opening closed more firmly and obtain the better stringency.

In some embodiments, the buffer layer 42 may be a foam layer. The foam has the light weight, ultrathin volume, heat and pressure resistance or other properties. The foam material is used as the buffer layer 42, where it is convenient to use and not easy to be damaged, which facilitates the thinning tendency of the shading tape 4 and thus facilitates the thinning tendency of the backlight unit.

Figure 2:
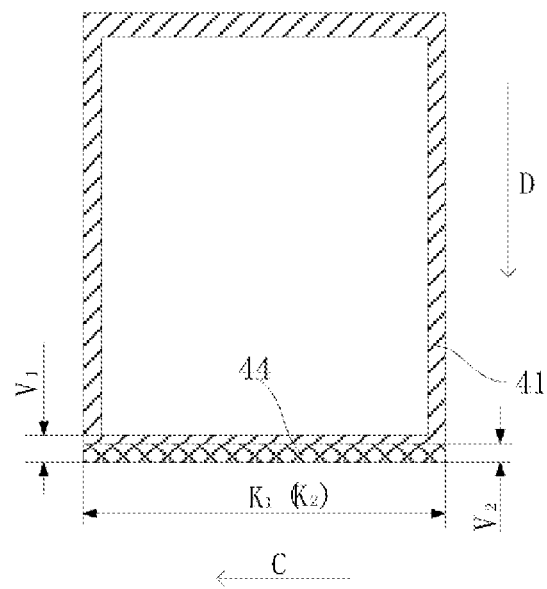
FIG. 2 is a schematic diagram of a shading tape in accordance with an embodiment of the disclosure in top view.
Figure 3:
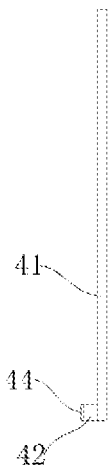
FIG. 3 is a schematic diagram of the shading tape in FIG. 2 in side view.

In some embodiments, the buffer layer 42 is the strip-shaped foam, the through groove 425 is a strip-shaped through groove. The strip-shaped foam includes a first side wall 421, a second side wall 422, a third side wall 423 and a fourth side wall 424 perpendicular to the tape body 41. The first side wall 421 is opposite to the third side wall 423, and the second side wall 422 is opposite to the fourth side wall 424. As shown in FIGS. 2 and 3, the buffer layer 42 is the strip-shaped foam which can be arranged at one side of the tape body 41, and the through groove 425 may be a strip-shaped through groove. The foam around the through groove 425 forms the first side wall 421, the second side wall 422, the third side wall 423 and the fourth side wall 424 perpendicular to the tape body 41. The through groove 425 is simple in structure and easy to fabricate, and facilitates the arrangement of the heat dissipating component 43 and is convenient to use.

It should be noted that the shape of the buffer layer 42 may also be another shape, and the shape of the through groove 425 in the buffer layer 42 may also be another shape. The shape of the buffer layer 42 and the shape of the through groove 425 in the buffer layer 42 are not limited in the embodiment.

In some embodiments, the length size of the strip-shaped foam is same as the length size of the portion of the tape body 41 corresponding to the strip-shaped foam, and the width size of the strip-shaped foam is less than or equal to three quarters of the width size of the portion of the tape body 41 corresponding to the strip-shaped foam. As shown in FIGS. 2 to 5, the length size of the portion of the tape body 41 corresponding to the strip-shaped foam is the size of the portion of the tape body 41 corresponding to the strip-shaped foam in the direction C, i.e., $K_1$, and the width size of the portion of the tape body 41 corresponding to the strip-shaped foam is the size of the portion of the tape body 41 corresponding to the strip-shaped foam in the direction D, i.e., $V_1$. The arranging direction of the second side wall 422 and the fourth side wall 424 is the direction C in FIG. 2, the arranging direction of the first side wall 421 and the third side wall 423 is the direction D in FIG. 2, the length size of the strip-shaped foam is the size in the arranging direction of the second side wall 422 and the fourth side wall 424, i.e., $K_2$, and the width size of the strip-shaped foam is the size in the arranging direction of the first side wall 421 and the third side wall 423, i.e., $V_2$. The length size of the strip-shaped foam is same as the length size of the edge portion of the tape body 41, i.e., $K_2 = K_1$, which can increase the contact area of the strip-shaped foam and the shading tape 4 and can increase the heat dissipation area as much as possible when the shading tape 4 is used for the backlight unit. The width size of the strip-shaped foam is less than or equal to three quarters of the width size of the tape body 41, i.e., $V_2 \le \frac{3}{4} V_1$, to make the width of the strip-shaped foam not exceed the width size of the tape body 41 and avoid the influence on the shading effect of the shading tape 4, so that the shading effect of the shading tape 4 is not influenced when it has the heat dissipation effect.

Figure 4:
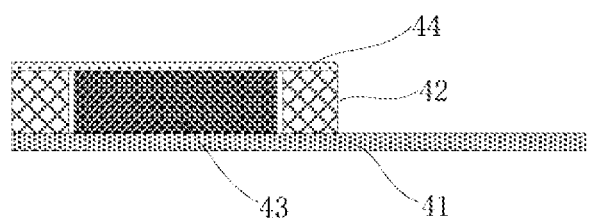
FIG. 4 is a schematic structural diagram of a shading tape in accordance with an embodiment of the disclosure.
Figure 6:
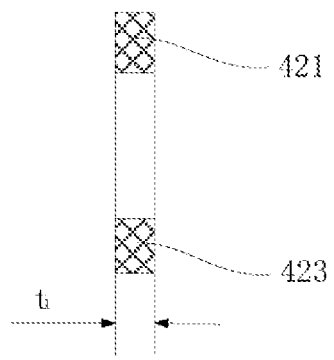
FIG. 6 is a schematic diagram of the cross section along the direction A-A in FIG. 5.

As shown in FIGS. 4 and 6, the size of the strip-shaped foam in the direction perpendicular to the tape body 41 is greater than or equal to 0.06 mm and less than or equal to 0.2 mm. The size of the heat dissipating component 43 in the direction perpendicular to the tape body 41 is less than or equal to the size of the strip-shaped foam in the direction perpendicular to the tape body 41. The size of the strip-shaped foam in the direction perpendicular to the tape body 41 is the thickness size $t_1$ of the strip-shaped foam, where the thickness size of the strip-shaped foam is set to 0.06 mm~0.2 mm, i.e., 0.06 mm≤$t_1$≤0.2 mm, so that the strip-shaped foam with the suitable thickness size can be selected according to the internal components of the backlight unit and the heat dissipating component 43 with the suitable thickness is selected, which helps to enhance the heat dissipation effect and is convenient for the thinning tendency design of the backlight unit.

In some embodiments, the size of the sealing layer 44 in the direction perpendicular to the tape body 41 is less than or equal to 0.05 mm. The size of the sealing layer 44 in the direction perpendicular to the tape body 41 is the thickness size of the sealing layer 44, where the thickness size of the sealing layer 44 is less than or equal to 0.05 mm. On the basis that the second opening of the through groove 425 may be closed, the thinner sealing layer 44 can help to enhance the heat dissipation effect and is convenient for the thinning tendency design of the backlight unit.

Figure 5:
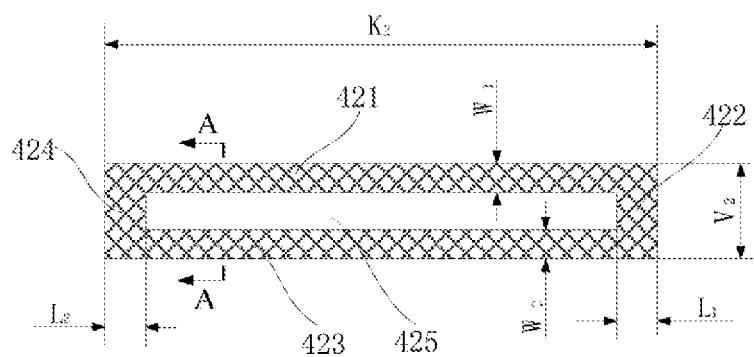
FIG. 5 is a schematic structural diagram of a buffer layer in accordance with an embodiment of the disclosure.

In some embodiments, the sizes of the first side wall 421 and the third side wall 423 in the arranging direction of the first side wall 421 and the third side wall 423 are both greater than or equal to 0.3 mm; and/or the sizes of the second side wall 422 and the fourth side wall 424 in the arranging direction of the second side wall 422 and the fourth side wall 424 are both greater than or equal to 0.3 mm. As shown in FIGS. 4 and 5, the sizes of the first side wall 421 and the third side wall 423 in the arranging direction of the first side wall 421 and the third side wall 423 are $W_1$ and $W_2$ respectively, and $W_1 \ge 0.3$ mm, $W_2 \ge 0.3$ mm; and the sizes of the second side wall 422 and the fourth side wall 424 in the arranging direction of the second side wall 422 and the fourth side wall 424 are $L_1$ and $L_2$, and $L_1 \ge 0.3$ mm, $L_2 \ge 0.3$ mm. The suitable $W_1$, $W_2$, $L_1$ and $L_2$ are selected in the range greater than or equal to 0.3 mm, so that the first side wall 421 and the third side wall 423 are both suitable in size in the arranging direction of the first side wall 421 and the third side wall 423, and the second side wall 422 and the fourth side wall 424 are both suitable in size in the arranging direction of the second side wall 422 and the fourth side wall 424. Therefore, the protective effect on the heat dissipating component 43 within the through groove 425 is better, and the through groove 425 can have the suitable size settings, which helps to enhance the heat dissipation effect.

In some embodiments, the sizes of the first side wall 421 and the third side wall 423 in the arranging direction of the first side wall 421 and the third side wall 423 are same; and/or the sizes of the second side wall 422 and the fourth side wall 424 in the arranging direction of the second side wall 422 and the fourth side wall 424 are same. As shown in FIGS. 4 and 5, the sizes of the first side wall 421 and the third side wall 423 in the arranging direction of the first side wall 421 and the third side wall 423 may be set to be same, i.e., $W_1 = W_2$; or the sizes of the second side wall 422 and the fourth side wall 424 in the arranging direction of the second side wall 422 and the fourth side wall 424 may be set to be same, i.e., $L_1 = L_2$; or let $L_1 = L_2$ when setting $W_1 = W_2$, so that the sizes of the first side wall 421 and the third side wall 423 in the arranging direction of the first side wall 421 and the third side wall 423 are same, or the sizes of the second side wall 422 and the fourth side wall 424 in the arranging direction of the second side wall 422 and the fourth side wall 424 are same, which facilitates the structural configuration of the buffer layer 42 to make the structure of the buffer layer 42 simpler and easy to fabricate.

In some embodiments, the sealing layer 44 is a single-sided tape. The surface of the sealing layer 44 facing the buffer layer 42 has adhesive to be glued to the buffer layer 42 and to seal the second opening of the buffer layer 42. The sealing layer 44 is configured as the single-sided tape, of which the use is convenient and reliable.

In some embodiments, the tape body 41 is a double-sided tape. The tape body 41 is configured as the double-sided tape, where one side of the tape body 41 may be glued to the buffer layer 42 directly, and the other side of the tape body 41 can be glued to the corresponding portion of the backlight unit directly, to omit the applying of the additional adhesives, and the direct adhesive fabrication of the tape body 41 and the buffer layer 42 is simple and convenient, and has the better structure stability.

In some embodiments, the heat dissipating component 43 is a graphite flake. The graphite flake has the good heat conduction and heat dissipation performance, the lower price and the good economic benefit.

In some embodiments, the graphite flake is the strip-shaped graphite flake, and the graphite flake is arranged in the through groove 425 and is in clearance fit with the through groove 425. The graphite flake is in the clearance fit with the through groove 425 on the buffer layer 42, that is, a gap is formed between the graphite flake and the buffer layer 42, which prevents the graphite flake from being extruded by the buffer layer 42 around it, avoids the damage of the graphite flake and facilitates the arrangement of the graphite flake.

The disclosure further provides a backlight unit, which includes: a light guide plate 1; a light source 2 arranged at the light incidence side of the light guide plate 1; and optical film materials 3 arranged at the light emergence side of the light guide plate 1, and further includes any shading tape 4 according to the above embodiments. The shading tape 4 includes a tape body; a buffer layer located at a side of the tape body and provided with a through groove running through the buffer layer in a direction perpendicular to the tape body; a heat dissipating component located in the through groove; and a sealing layer located at a side of the buffer layer far away from the tape body and configured to close an opening of the through groove at the side of the buffer layer far away from the tape body. The shading tape 4 is located at the side of the optical film materials 3 far away from the light guide plate 1, and the buffer layer 42 of the shading tape 4 is located at the side of the tape body 41 far away from the optical film materials 3. The detailed description of the shaping tape may make reference to the above embodiments, a repeated description thereof will be omitted here.

In some embodiments, the buffer layer 42 is arranged at the portion of the tape body 41 corresponding to the light source 2 so that the buffer layer 42 corresponds to the light source 2. The buffer layer 42 of the shading tape 4 of the backlight unit is provided with the heat dissipating component 43 therein, and the buffer layer 42 corresponds to the light source 2, which can enhance the heat dissipation and help to lower the internal temperature of the backlight unit, and can effectively relieve the performance damage of the light guide plate 1 and other optical film materials 3 of the backlight unit due to the excessively high temperature and help to extend the service life of the backlight unit. Also the configuration structure of the heat dissipating component 43 is simple and easy to fabricate, which facilitates the thinning tendency of the backlight unit, and it is stable and reliable and has the lower cost.

In some embodiments, the optical film materials 3 includes a diffusion sheet, a lower prism sheet and an upper prism sheet arranged successively in the arranging direction from the light guide plate 1 to the shading tape 4.

In some embodiments, the backlight unit further includes: a reflective sheet 5 arranged at the side of the light guide plate 1 far away from its light emergence surface, where the portion of the reflective sheet 5 corresponding to the light source 2 is configured with a via hole 51. The edge portion at one side of the reflective sheet 5 corresponding to the light source 2 is configured with the via hole 51, the via hole 51 is positioned in the area of the reflective sheet 5 corresponding to the non-display area of the light emergence surface of the backlight unit, and the via hole 51 may correspond to the light source 2. The via hole 51 is arranged in the reflective sheet 5, facilitates the ventilation inside the backlight unit and makes the internal ventilation intensify after the temperature of the backlight unit rises, which can take away the local heat of the light source 2 and have the heat dissipation effect. Meanwhile, the via hole 51 corresponds to the light source 2, so the arrangement of the via hole 51 can make the fool-proofing effect of the reflective sheet 5 better and avoid the occurrence of the abnormal assembly condition.

Figure 7:
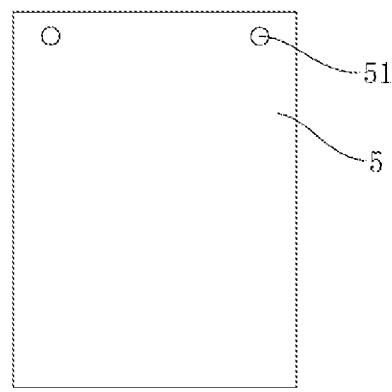
FIG. 7 is a schematic structural diagram of a reflective sheet in accordance with an embodiment of the disclosure.

As shown in FIGS. 1 and 7, each of two corners of the edge portion of the reflective sheet 5 corresponding to the light source 2 is configured with one via hole 51, and the via hole 51 corresponds to the light source 2. The portion of the reflective sheet 5 corresponding to the light source 2 is configured with two via holes 51, to increase the ventilation effect and enhance the heat dissipation. Also the arrangement is simple and reliable, and may avoid the influence on the reflection effect of the reflective sheet 5. It should be noted that the arranging position of the via hole 51 on the reflective sheet 5 can also be another position of the reflective sheet, and the number of the via holes 51 can also be 1, 3, 4, or another number, which are not limited by the embodiment.

In some embodiments, the diameter size of the via hole 51 is less than or equal to 0.5 mm. According to the structural design of the backlight unit, the suitable diameter size of the via hole 51 is selected in the size range less than or equal to 0.5 mm, which helps to enhance the heat dissipation effect of the backlight unit.

In some embodiments, in the backlight unit above, the buffer layer is a foam layer.

In some embodiments, in the backlight unit above, the buffer layer is strip-shaped foam, the through groove is a strip-shaped through groove, and the strip-shaped foam includes a first side wall, a second side wall, a third side wall and a fourth side wall perpendicular to the tape body, the first side wall is opposite to the third side wall, and the second side wall is opposite to the fourth side wall.

In some embodiments, in the backlight unit above, a size of the strip-shaped foam in a direction perpendicular to the tape body is greater than or equal to 0.06 mm and less than or equal to 0.2 mm; a size of the heat dissipating component in the direction perpendicular to the tape body is less than or equal to the size of the strip-shaped foam in the direction perpendicular to the tape body.

In some embodiments, in the backlight unit above, a size of the sealing layer in a direction perpendicular to the tape body is less than or equal to 0.05 mm.

In some embodiments, in the backlight unit above, sizes of the first and third side walls in an arranging direction of the first and third side walls are both greater than or equal to 0.3 mm; and/or sizes of the second and fourth side walls in an arranging direction of the second and fourth side walls are both greater than or equal to 0.3 mm.

In some embodiments, in the backlight unit above, sizes of the first and third side walls in an arranging direction of the first and third side walls are same; and/or sizes of the second and fourth side walls in an arranging direction of the second and fourth side walls are same.

In some embodiments, the light source 2 is an LED light.

The disclosure further provides a display device, which includes any backlight unit according to the above embodiments. The backlight unit includes: a light guide plate; a light source arranged at a light incidence side of the light guide plate; optical film materials arranged at a light emergence side of the light guide plate; and a shading tape. The shading tape includes: a tape body; a buffer layer located at a side of the tape body and provided with a through groove running through the buffer layer in a direction perpendicular to the tape body; a heat dissipating component located in the through groove; and a sealing layer located at a side of the buffer layer far away from the tape body and configured to close an opening of the through groove at the side of the buffer layer far away from the tape body. The shading tape is located at a side of the optical film materials far away from the light guide plate, and the buffer layer of the shading tape is located at a side of the tape body far away from the optical film materials. The detailed description of the backlight unit may make reference to the above embodiments, a repeated description thereof will be omitted here.

Evidently those skilled in the art can make various modifications and variations to the embodiments of the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. A shading tape, comprising:
   a tape body;
   a buffer layer located at a side of the tape body and provided with a through groove running through the buffer layer in a direction perpendicular to the tape body;
   a heat dissipating component located in the through groove; and
   a sealing layer located at a side of the buffer layer far away from the tape body and configured to close an opening of the through groove at the side of the buffer layer far away from the tape body;
   wherein the buffer layer is a foam layer.

2. The shading tape according to claim 1, wherein the buffer layer is strip-shaped foam, the through groove is a strip-shaped through groove, and the strip-shaped foam comprises a first side wall, a second side wall, a third side wall and a fourth side wall perpendicular to the tape body, the first side wall is opposite to the third side wall, and the second side wall is opposite to the fourth side wall.

3. The shading tape according to claim 2, wherein a size of the strip-shaped foam in a direction perpendicular to the tape body is greater than or equal to 0.06 mm and less than or equal to 0.2 mm;
   a size of the heat dissipating component in the direction perpendicular to the tape body is less than or equal to the size of the strip-shaped foam in the direction perpendicular to the tape body.

4. The shading tape according to claim 2, wherein a size of the sealing layer in a direction perpendicular to the tape body is less than or equal to 0.05 mm.

5. The shading tape according to claim 2, wherein sizes of the first and third side walls in an arranging direction of the first and third side walls are both greater than or equal to 0.3 mm; and/or
   sizes of the second and fourth side walls in an arranging direction of the second and fourth side walls are both greater than or equal to 0.3 mm.

6. The shading tape according to claim 2, wherein sizes of the first and third side walls in an arranging direction of the first and third side walls are same; and/or
   sizes of the second and fourth side walls in an arranging direction of the second and fourth side walls are same.

7. The shading tape according to claim 1, wherein the sealing layer is a single-sided tape.

8. The shading tape according to claim 1, wherein the tape body is a double-sided tape.

9. The shading tape according to claim 1, wherein the heat dissipating component is a graphite flake.

10. A backlight unit, comprising:
    a light guide plate;
    a light source arranged at a light incidence side of the light guide plate;
    optical film materials arranged at a light emergence side of the light guide plate; and
    a shading tape, which comprises:
    a tape body;
    a buffer layer located at a side of the tape body and provided with a through groove running through the buffer layer in a direction perpendicular to the tape body;
    a heat dissipating component located in the through groove; and
    a sealing layer located at a side of the buffer layer far away from the tape body and configured to close an opening of the through groove at the side of the buffer layer far away from the tape body;
    wherein the shading tape is located at a side of the optical film materials far away from the light guide plate, and the buffer layer of the shading tape is located at a side of the tape body far away from the optical film materials.

11. The backlight unit according to claim 10, further comprising:
    a reflective sheet arranged at a side of the light guide plate far away from its light emergence surface, wherein a portion of the reflective sheet corresponding to the light source is provided with a via hole.

12. The backlight unit according to claim 11, wherein a diameter size of the via hole is less than or equal to 0.5 mm.

13. The backlight unit according to claim 10, wherein the buffer layer is a foam layer.

14. The backlight unit according to claim 13, wherein the buffer layer is strip-shaped foam, the through groove is a strip-shaped through groove, and the strip-shaped foam comprises a first side wall, a second side wall, a third side wall and a fourth side wall perpendicular to the tape body, the first side wall is opposite to the third side wall, and the second side wall is opposite to the fourth side wall.

15. The backlight unit according to claim 14, wherein a size of the strip-shaped foam in a direction perpendicular to the tape body is greater than or equal to 0.06 mm and less than or equal to 0.2 mm;

a size of the heat dissipating component in the direction perpendicular to the tape body is less than or equal to the size of the strip-shaped foam in the direction perpendicular to the tape body.

16. The backlight unit according to claim 14, wherein a size of the sealing layer in a direction perpendicular to the tape body is less than or equal to 0.05 mm.

17. The backlight unit according to claim 14, wherein sizes of the first and third side walls in an arranging direction of the first and third side walls are both greater than or equal to 0.3 mm; and/or
sizes of the second and fourth side walls in an arranging direction of the second and fourth side walls are both greater than or equal to 0.3 mm.

18. The backlight unit according to claim 14, wherein sizes of the first and third side walls in an arranging direction of the first and third side walls are same; and/or
sizes of the second and fourth side walls in an arranging direction of the second and fourth side walls are same.

19. A display device, comprising a backlight unit, wherein the backlight unit comprises:
a light guide plate;
a light source arranged at a light incidence side of the light guide plate;
optical film materials arranged at a light emergence side of the light guide plate; and
a shading tape, which comprises:
a tape body;
a buffer layer located at a side of the tape body and provided with a through groove running through the buffer layer in a direction perpendicular to the tape body;
a heat dissipating component located in the through groove; and
a sealing layer located at a side of the buffer layer far away from the tape body and configured to close an opening of the through groove at the side of the buffer layer far away from the tape body;
wherein the shading tape is located at a side of the optical film materials far away from the light guide plate, and the buffer layer of the shading tape is located at a side of the tape body far away from the optical film materials.

* * * * *